MAGNETIC PUNCH SYSTEM

Filed Sept. 7, 1967 2 Sheets-Sheet 1

INVENTORS.
PAUL E. GUNDERSON
ROBERT W. KULTERMAN
NORMAN S. STOCKDALE

BY
Sughrue, Rothwell, Mion, Zinn & Macpeak
ATTORNEYS.

MAGNETIC PUNCH SYSTEM

Filed Sept. 7, 1967 2 Sheets-Sheet 2

INVENTORS.
PAUL E. GUNDERSON
ROBERT W. KULTERMAN
NORMAN S. STOCKDALE

BY
Sughrue, Rothwell, Mion, Zinn & Macpeak
ATTORNEYS.

3,465,958

MAGNETIC PUNCH SYSTEM

Paul E. Gunderson, Robert W. Kulterman, and Norman S. Stockdale, Rochester, Minn., assignors to International Business Machines Corporation, Armonk, N.Y., a corporation of New York Filed Sept. 7, 1967, Ser. No. 666,056
Int. Cl. G06k *1/05;* B26f *1/04;* B26d *5/20*
U.S. Cl. 234—108 6 Claims

ABSTRACT OF THE DISCLOSURE

A system including an alternating current synchronous motor for incrementally moving a document and an alternating current energized punch coil operated in synchronism therewith, but out of phase, such that the punch operates when the document feed ceases.

Record cards which are moved through a punch station at relatively high speed are selectively punched to record information on the card in the form of coded punch holes. Generally, the cards are incremented or stepped through the punch apparatus with the cards stopped while selected punches penetrate the card. In the past, the incrementing mechanism has been synchronized with the punch mechanism to ensure that punching occurs only at the time that the cards are physically stopped. The known methods employ mechanical means to synchronize the operation of the punch to that of the card incrementor. A representative apparatus employs a standard Geneva drive coupled to a continuously rotating input shaft for converting the continuous rotary motion to intermittent rotary motion to effect stepped advancement of the card. The same continuous drive shaft is coupled by means of eccentrics to the punches at each punch position whereby a selected punch is oscillated at right angles to the path of movement of the card to achieve penetration during dwell of the feed mechanism.

Such mechanical synchronization means are not only subject to wear, which results in some lack of synchronism, but more importantly, the mechanical means coupling the feed and punch apparatus tends to unduly limit the rate of document feed and information transfer.

In an attempt to increase the information transfer rate attempts have been made to implement such systems by substituting for the mechanically operated punches, punches which are electrically operated, including a punch coil which is selectively energized to cause the punching member to pierce the card or document at relatively high speed. While the employment of electrically actuated punches increases the recording speed of the system, it creates the problem of maintaining the desired synchronism between the punching mechanism and the card feed to ensure that punching occurs during card feed dwell.

It is therefore a primary object of this invention to provide an improved high speed magnetic punch system in which the document is incremented during punch dwell and in which synchronism is ensured between out of phase punching and card stepping.

It is a further object of this invention to provide an improved magnetic punch system which employs a common alternating current electrical input to both the punch magnet and an alternating current synchronous motor wherein the alternating current voltage acts as an inherent clocking signal for synchronizing both the card feed and punch mechanism.

It is a further object of this invention to provide an improved high speed card punch system with the cards being incremented during punch dwell which eliminates the need for mechanical synchronizing media, such as emitters, amplifiers, clutches, etc.

It is a further object of this invention to provide an improved fully electric, synchronized punch and incrementing system for allowing selective punching of information carrying cards at high speed which greatly facilitates adjustment of either the feed rate, the length of the feed increment, the frequency and speed of operation of the magnetic punches while at all times maintaining complete out of phase synchronization between the two major units.

It is a further object of this invention to provide an improved all electric punch and document incrementing system which eliminates the need for close tolerance parts for both the feed and punch mechanism.

Other objects of this invention will be pointed out in the following detailed description and claims and illustrated in the accompanying drawings which disclose, by way of example, the principle of the invention and the best mode which has been contemplated of applying that principle.

Figures 1, 2A:
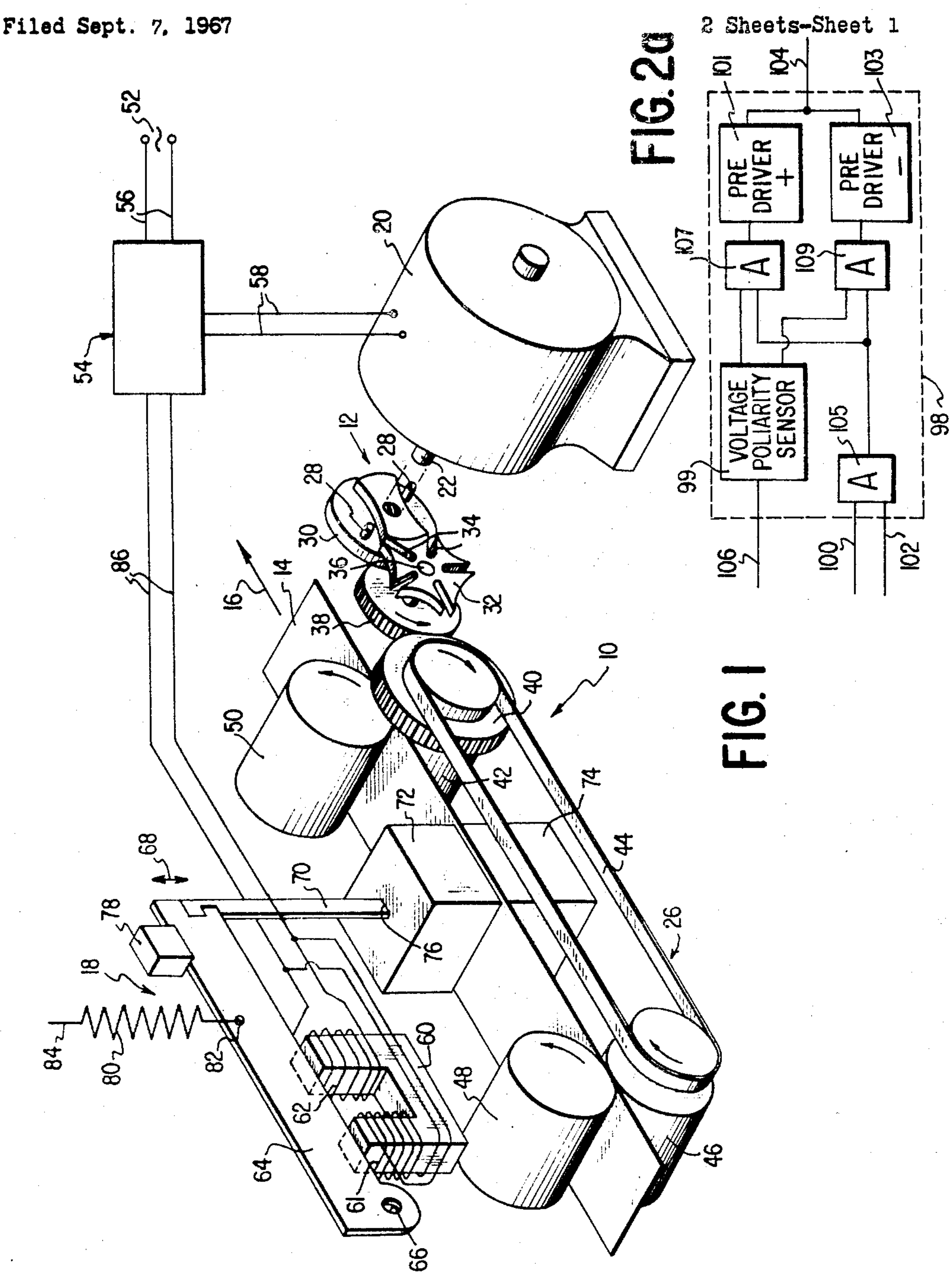
FIGURE 1 is a perspective view of the components forming the magnetic punch system of the present invention.
Figure 2:
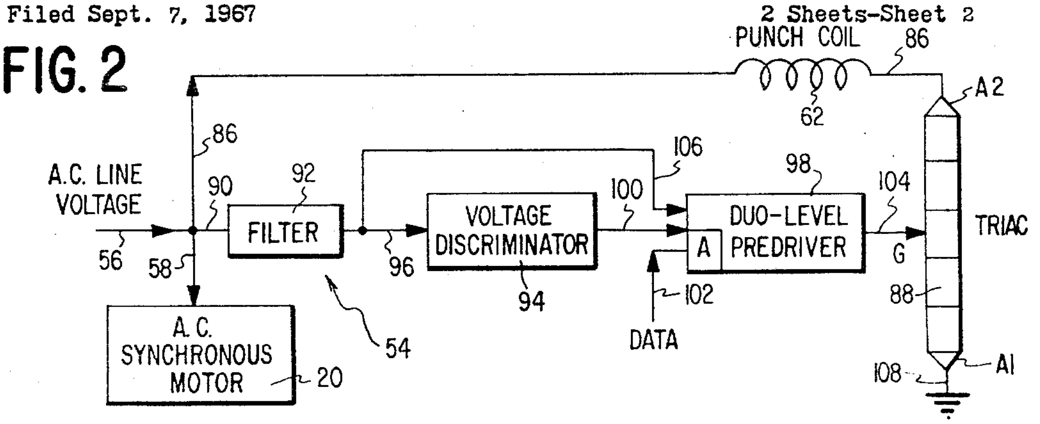
FIGURE 2 is an electrical schematic, partially in block form, of the electrical circuit for the magnetic punch system of FIGURE 1.

FIGURE 2*a* shows the duo-level pre-driver of FIGURE 2 in more detail.

Figures 3A, 3B:
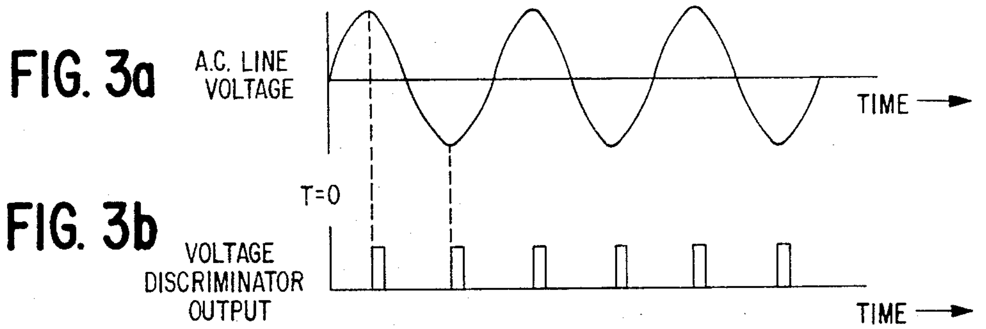

FIGURE 3*a* is a plot of the alternating current line voltage signal applied simultaneously to the synchronous motor and the punch coil which forms the principal components of the present system.

FIGURE 3*b* is a plot of the electrical output pulses from the voltage discriminator shown in FIGURE 2.

Figure 3C:
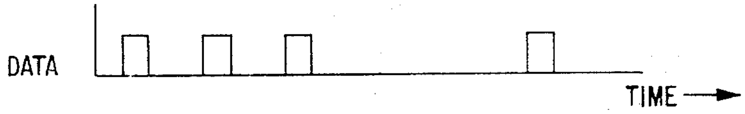

FIGURE 3*c* is a plot of the input to the magnetic punch component of the system in the form of applied electrical pulses.

Figure 3D:
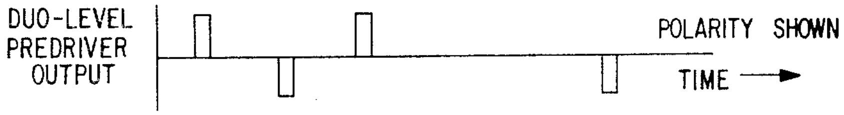

FIGURE 3*d* is a plot of the pulse output of the duo-level predriver shown in FIGURE 2.

Figure 3E:
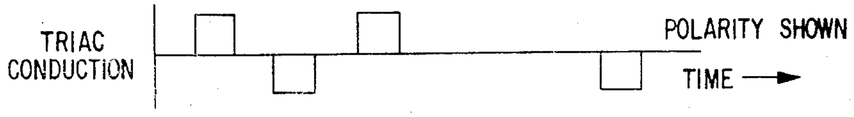

FIGURE 3*e* is a plot of the electrical pulses passing from the Triac to the punch coil of FIGURE 2.

Figure 3F:
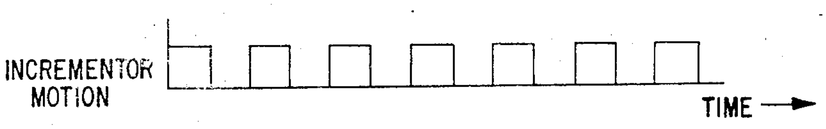

FIGURE 3*f* is a plot of incrementor motion against time.

In general, the apparatus of the present invention comprises an improved high speed magnetic punch system including means for incrementing a workpiece by means of a continuously energized alternating current motor. The system further includes a punch mechanism overlying the workpiece having an electrical coil for selectively actuating a punch carried thereby. Means are provided for supplying alternating current input simultaneously to the motor and the punch coil to achieve workpiece stepping during punch dwell and vice versa.

Preferably, the system employs a common source of alternating current which is coupled to alternating current synchronous motor whose output is mechanically coupled to a conventional Geneva gear mechanism to achieve stepping of the workpiece. The same alternating current input voltage is applied to the magnetic punch coil through a voltage discriminator to provide the necessary timing pulse. Further, a data pulse for proper punch selection is applied to an AND gate along with the output of the voltage discriminator and a filtered line voltage, which determines the polarity of the predriver output pulse, to affect out of phase punch actuation during feed increment dwell. To increase the punching rate, a bi-directional current semiconductor device is coupled between the punch coil and the predriver output.

Referring to FIGURE 1 of the drawings, the improved high speed magnetic punch system of the present invention is indicated generally at 10 and includes two main components which operate out of phase. The first component, indicated generally at 12, is the increment or stepping drive mechanism for incrementing the document 14 in the direction shown by arrow 16. The second main component comprises the magnetic punch mechanism or assembly, indicated generally at 18, which overlies the moving document or workpiece 14. Of course, in order to effect the punching of information in the form of coded perforations within the stepped document 14, there are normally provided a series of transversely aligned punch assemblies, although for the purposes of explaining the present invention, only a single punch mechanism 18 is shown.

Turning first to the document incrementing mechanism 12 of the system, the incrementor prime mover 20 comprises, in this case, a two-pole, self-starting, single phase, reluctance type alternating current synchronous motor. This type of motor will start as an induction motor and accelerate to a small value of slip under light loads. A reluctance torque results from the tendency of the rotor to align itself in a minimum reluctance position with respect to the synchronously revolving air gap flux wave. At small slip, this torque alternates slowly in sense. If the moment of inertia of the mechanical loads is sufficiently small, the positive sense of the alternating reluctance torque will accelerate the rotor from slip speed to synchronous speed. This results in a synchronous speed for the output shaft 22. The rotor will continue operation at synchronous speed provided the mechanical loading limits of the motor 20 are not violated. Thus, for the Geneva gear mechanism 12, and the belt drive mechanism 26, these mechanical components are, even when actively driving the card, tape or other form of document 14, placing a load on the synchronous drive motor 20 which is well within its mechanical loading limits. The output shaft 22 will continue to rotate at synchronous speed to provide the desired constant speed incrementing or stepping of the document 14.

Insofar as the alternating current synchronous motor 20 is concerned, this motor is conventional and its characteristics are well known. In order to stress the ready application of such a motor to the required synchronized out of phase operation of the document feed to the punch mechanism 18, the relationship between the magnetic reluctance of the motor components and the flux in the air gap with respect to time will be explained. A mathematical analysis of the synchronous reluctance motor demonstrates a dependence upon the average torque required by the mechanical loads impressed upon the motor. The mathematical relationship between rotor position and phase of the alternating current line voltage can be easily derived because reluctance is a function of rotor position and flux is a function of alternating current line voltage phase. The present invention depends upon this mathematical relationship in combination with a careful intermittent motion mechanism. The combination ensures document incrementing which is clocked by the alternating current line frequency provided that transient mechanical loads are appropriately defined and controlled.

The revolutions per second of a two-pole synchronous motor is equal to the frequency in cycles per second of the source voltage. Obviously, putting two Geneva drive pins 28, circumferentially spaced 180°, on drive rotor 30 causes the Geneva star wheel 32 to step twice per rotor 30 revolution, or document incrementing is performed at twice line frequency. The output element or star wheel 32 is rotated incrementally in conventional Geneva gear fashion with the pins 28 moving into the spaced slots 34 and causing intermittent rotation of star wheel 32 when the pins bottom out within the slots 34. The Geneva gear star wheel 32 is carried by output shaft 36, to which is coupled at the opposite end spur gear 38. The spur gear 38 acts to drive a driven gear member 40 which is coupled to a friction drive cylinder 42. By means of belt 44, a second drive cylinder 46 is positively driven in the same direction and at the same speed as the first friction drive cylinder 42. A pair of follower cylinders 48 and 50 cooperate with the driven cylinders 46 and 42, respectively, to effect the positive incrementing of the documents, such as 14, except during the dwell time of the Geneva gear drive mechanism 24.

The revolutions per second of a two-pole synchronous motor is equal to the frequency in cycles per second of the source voltage. Putting two Geneva pins 28 on the rotor 30 causes the Geneva gear mechanism 24 to step twice per rotor revolution and incrementing of document 14 is performed at twice line frequency. Since the apparatus of the present invention may be readily modified, the incrementing operation of the system may be readily varied. In general, the following statements would apply. The speed of the synchronous motor is inversely proportional to the number of poles as given by the equation:

$$\text{Revolutions per second} = \frac{2\ (\text{line frequency in cycles per second})}{\text{number of poles}}$$

Therefore, to increment the document at twice line frequency, the number of Geneva drive pins 28 must equal the number of poles of the alternating current synchronous reluctance motor 20.

In order to energize the synchronous motor, a source of alternating current is employed, as shown at 52, which passes to a block 54 representing the electrical control circuit for the present system by means of input lines 56. The alternating current line voltage is delivered from the control circuit to the alternating current synchronous reluctance motor 20 through leads 58. Thus, at any time the line voltage is applied to the control circuit, indicated generally at 54, the motor 20 will be energized through lines 58 and cause incrementing (in this case, of document 14 at twice line frequency).

Turning next to the work magnet punch mechanism 18, it is noted that the punch mechanism consists of a stationary U-shaped magnetic core 60 having coils 61 and 62 wound on each leg. Armature 64 is pivotally mounted by means of opening 66 at its left-hand end, allowing limited oscillation about the axis formed thereby in the vertical plane, as indicated by double-ended arrow 68. A vertical punch 70 is carried at the opposite end of the armature 64 and rides within an apertured upper, stationary guide block 72. A lower guide block 74 cooperates with the upper block and is separated by a small gap, through which the incremented document 14 passes. Block 72 is shown as being apertured centrally at 76 so as to receive the reciprocating punch 70.

A stationary stop 78 is positioned above the armature and determines the position of the armature and therefore the punch 70 during the time the punch coils are de-energized. In this respect, biasing means, such as spring 80, is coupled at its lower end 82 to the punch armature 64, while the upper end 84 is coupled to a fixed support (not shown) to provide the necessary bias to normally maintain the punch 70 in its raised position against fixed stop 78. Coil 61 which can be connected in series or parallel with coil 62 is shown as being connected in parallel with coil 62. When coils 61 and 62 are energized, the force of attraction on armature 64 causes the rotational translation of the armature resulting in the punching of a hole of perforation within the then stationary document 14. The attractive force of the flux surrounding the coils 61 and 62 supplies the energy required to punch the hole and to move the armature assembly inertia within the time constraint. Restoration and holding of the armature in a cocked position is accomplished by an elastic medium, in this case, the coil spring 80. Conventional alternating current line voltage having a frequency of 60 cycles per seconds operates satisfactorily as the power source at 52. While control of the alternating current to the punch coils could be performed by either silicon control rectifier means or saturable reactor means, the present invention advantageously employs a bidirectional current conducting semiconductor device known as a "Triac." The Triac forms a portion of the control system within block 54, whose output passes to the spaced coils 61 and 62 through output lead 86. Because the Triac can conduct electrical current in both directions, the punch coils may be energized on either half cycle of the alternating current line voltage, allowing the frequency of the punch mechanism to be twice that of the line frequency and thus coordinated to the output of the Geneva gear mechanism 24. An advantage of a "Triac" is the elimination of the full wave rectifier or back-to-back silicon controlled rectifiers conventionally used to allow operation of a punch or other electrical device at twice the natural frequency of the alternating current supply.

Referring to FIGURE 2, there is shown schematically (and partially in block form), the components of the control circuit indicated by block 54 in FIGURE 1. The common alternating current line voltage is fed through input line 56 to the punch coils 61 and 62 through lines 86 and to the alternating current synchronous motor 20 through lines 58. In order to properly present the electrical current input in pulse form to the punch coils 61 and 62, both in relation to the frequency of the alternating current input signal and in the proper phase relationship with respect to the alternating current synchronous motor 20, the control system 54 employs, in addition to Triac 88, a number of other components. For instance, through line 90, the alternating current line voltage from source 52 is applied to a sharply tuned bandpass filter 92. Filter 92 passes only the line frequency and rejects all others in order to eliminate exposure to false operation arising from line noise. The filtered signal is fed to a voltage discriminator 94 through line 96. The voltage discriminator 94 senses the line voltage and provides a pulse output at the proper points in the line voltage waveform, thus providing the necessary timing pulse for the duo-level predrivers, such as predriver 98. The voltage discriminator is coupled to predriver 98 through line 100. The output of the voltage discriminator 94 will service all predrivers, although it is shown as passing only to predriver 98 associated with Triac 88 and punch coil 62. The predriver 98 is a three input device. Two inputs, the data line 102 from a data source (not shown), and the voltage discriminator pulse through line 100 will be logically ANDED to provide the output pulse from the predriver which passes through line 104 and gate G to Triac 88. A third input through line 106 carries the filtered line voltage which will determine the polarity of the predriver output pulse. Reference to FIGURE 2*a* shows the predriver 98 as including a voltage polarity sensor component 99 a positive predriver component 103 and appropriate AND circuits 105, 107 and 109. The AND circuit 105 having inputs from lines 100 and 102 conditions the two other AND circuits 107 and 109 which also have inputs from the voltage polarity sensor 99. The voltage polarity sensor 99 receives its input from line 106. The positive and negative predriver components 101 and 103 are then controlled by the two AND circuits 107 and 109 respectively, whereby either predriver component provides an output on line 104, depending upon which AND circuit has been conditioned to pass a signal to the associated predriver component. Of course, the AND circuit 107 and 109 which will be conditioned depends upon the output from the voltage polarity sensor component 99. That is, a positive polarity output pulse is generated by the predriver 98 during the positive half cycle of the line voltage and the predriver 98 provides a negative polarity output pulse during the negative half cycle. The following two methods are preferable for gating the "Triac." If the "Triac" will conduct when anode $A_2$ is positive with respect to anode $A_1$ a positive voltage with respect to $A_1$ of sufficient magnitude is applied to its gate G (line 104). The anode $A_1$ side of the Triac 88 is shown grounded at 108. When anode $A_2$ is negative with respect to anode $A_1$, the gate pulse should be negative with respect to $A_1$ to achieve "Triac" conduction and deliver AC line voltage to the punch coils 61 and 62.

The operation of the components of the present system may be best appreciated by referring to the voltage plot of FIGURES 3*a* through 3*f*, respectively. System timing is readily indicated by referring to the plot sequence from FIGURES 3*a* through 3*f*. The motor characteristics referred to previously, support the equation for the rotor axis position relative to the stator axis theta, which can be written in the form:

$$\theta = wt + \sigma'$$

where $w$ is the radian frequency of the alternating current voltage source, $t$ is time and $\sigma$ is the angular displacement of the rotor axis from the stator axis when $t$ is equal to zero. If the Geneva drive pins 28 are loacted so as to initially engage the star wheel 32 when $\theta$ is equal to $\sigma'$ and $\sigma'$ plus 180° and to maintain engagement for 90° when the pins bottom within slots 34, incrementing will take place from:

$$\theta = \sigma' + n\pi$$

to $$\theta = \sigma + \frac{(2n+1)\pi}{2}$$

With reference to the synchronized and out of phase operation of the punches 70, referring to FIGURE 3*b*, the voltage discriminator will provide a clock pulse, as indicated at:

$$\frac{(2n+1)\pi}{2}$$

where $n$ equals 0, 1, 2, 3 . . . , which, as noted from FIGURE 2, is a necessary condition for triggering the duo-level predrivers 98. Data will be presented to the appropriate predrivers at the time shown in FIGURE 3*c* to provide the remaining necessary logic condition to turn on the predriver selected. At $n=0$, a data pulse is shown as being applied to data input line 102 and to therefore provide a duo-level predriver output at line 104 or gate G associated with the Triac 88. The predriver line voltage polarity sensing will condition the predriver, such as predriver 98, to provide the proper polarity gate pulse to the Triac, as shown in FIGURE 3*d* where the station shown is selected on the first, second, third and sixth punch cycle. It is to be remembered that the punch cycle is twice line frequency. The Triac conducts, as indicated in FIGURE 3*e*, with the polarity shown to achieve punch operation regardless of the polarity of the alternating current line voltage. By comparing FIGURES 3*e* and 3*f*, it is noted that Triac conduction, and therefore, punch operation is achieved out of phase with respect to incrementor motion. That is, while the document 14 is being incremented, no punching occurs. Of course, incrementor and punch motion can occur simultaneously until the punch engages the document or after the punch leaves the document. However, while punch incrementor motion ceases, the alternating current synchronous motor 20 continues to rotate at a constant speed dependent upon line frequency.

The punch system of the present invention therefore is synchronized completely by the alternating current line voltage with inherent clocking and thus eliminating, at a cost saving, the mechanical synchronizing media, such as emitters, amplifiers, clutches and their attendant support hardware. In addition to the savings realized by line voltage clocking, savings are obtained by using alternating current power to drive the punch coils, thus saving the cost of a direct current power supply. The punch design eliminates many close tolerance parts, such as cams, interposers, etc., required for mechanical synchronization and allowing replacement with parts requiring fewer close tolerances. The present invention is shown and described in relation with a workpiece in the form of a document 14, although it has broad application to card punches, tape punches or systems employing printers rather than punches as a means for recording, at high speed, information to a stepped card, tape or other record workpiece.

While the invention has been particularly shown and described with reference to a preferred embodiment thereof, it will be understood by those skilled in the art that various changes in the form and details may be made therein without departing from the spirit and scope of the invention.

What is claimed is:

1. A system for punching an incremented workpiece comprising: a continuously energized alternating current synchronous motor, continuous to intermittent motion conversion means coupled to said motor and adapted to incrementally move said workpiece, means for correlating the position of said conversion means to the motor rotor, a punch mechanism including a punch coil operatively positioned relative to said incremented workpiece, and means to connect said punch coil and said synchronous motor to a common source of alternating current input whereby said punch coil is energized during dwell of the workpiece transport mechanism.

2. The system as claimed in claim 1 wherein said conversion means comprises a Geneva gear mechanism including a driving rotor and a driven star wheel, circumferentially spaced drive pins carried by said driving rotor with the number of pins being correlated to the number of poles carried by the synchronous motor.

3. The magnetic punch system as claimed in claim 1 further including electrical control means coupled between the alternating current voltages source and said punch coil, said control means including an AND gate having at least two inputs, means for coupling one of said inputs to said alternating current voltage source, and means for coupling the other input to a source of data input signals to achieve selective punch operation.

4. The system as claimed in claim 3 further including a tuned bandpass filter, means for coupling a tuned bandpass filter between said alternating current voltage source and said AND gate to eliminate line noise.

5. The system as claimed in claim 3 wherein said electrical control means includes voltage discriminator means and means for coupling said voltage discriminator means between said alternating current voltage source and said AND gate to provide a conditioning pulse to said AND gate at a proper time in the line voltage waveform.

6. The system as claimed in claim 5 wherein said AND gate includes two inputs and said electrical control means comprises a duo-level pre-driver responsive to said line voltage and the output of said AND gate to generate a gating signal having a polarity determined by the polarity of the line voltage at the time said AND gate passes a signal, and a bi-directional current semiconductor device coupled between said pre-driver and said coil and responsive to the gating signal from said pre-driver to energize said coil.

References Cited

UNITED STATES PATENTS

| | | | |
|---|---|---|---|
| 3,002,677 | 10/1961 | Haney et al. | 234—128 X |
| 3,093,303 | 6/1963 | Dirks | 234—108 |

WILLIAM S. LAWSON, Primary Examiner

U.S. Cl. X.R.

83—202, 274, 575; 234—128